United States Patent
Tong et al.

(10) Patent No.: US 11,916,427 B2
(45) Date of Patent: Feb. 27, 2024

(54) BATTERY MODULE AND POWER ARRANGEMENT METHOD

(71) Applicants: LITE-ON ELECTRONICS (GUANGZHOU) LIMITED, Guangzhou (CN); LITE-ON TECHNOLOGY CORPORATION, Taipei (TW)

(72) Inventors: Yung-Ping Tong, Taipei (TW); Yu-Kang Lo, Taipei (TW)

(73) Assignees: LITE-ON ELECTRONICS (GUANGZHOU) LIMITED, Guangzhou (CN); LITE-ON TECHNOLOGY CORPORATION, Taipei (TW)

( * ) Notice: Subject to any disclaimer, the term of this patent is extended or adjusted under 35 U.S.C. 154(b) by 366 days.

(21) Appl. No.: 17/385,677

(22) Filed: Jul. 26, 2021

(65) Prior Publication Data

US 2022/0216719 A1    Jul. 7, 2022

(30) Foreign Application Priority Data

Jan. 4, 2021 (CN) .......................... 202110002420.3

(51) Int. Cl.
H02J 7/00    (2006.01)
H02M 3/335    (2006.01)

(52) U.S. Cl.
CPC ...... *H02J 7/007182* (2020.01); *H02J 7/0013* (2013.01); *H02M 3/335* (2013.01)

(58) Field of Classification Search
None
See application file for complete search history.

(56) References Cited

U.S. PATENT DOCUMENTS

2010/0213897 A1* 8/2010 Tse .................. H02J 7/0013
320/126

* cited by examiner

*Primary Examiner* — Arun C Williams
(74) *Attorney, Agent, or Firm* — Innovation Counsel LLP

(57) ABSTRACT

The present invention discloses a battery module and a power arrangement method. The battery module includes a battery unit, an energy storage element, a switch, a functional circuit and a control unit. The energy storage element is coupled to the battery unit. The switch is coupled to the energy storage element. The functional circuit is respectively coupled to the battery unit and the energy storage element. The control unit is respectively coupled to the functional circuit and the switch, configured to control the functional circuit to cause the energy storage element to be coupled to the battery unit so that the battery unit charges the energy storage unit, or configured to control the functional circuit to cause the energy storage element to be decoupled with the battery unit so that a discharge path is formed.

18 Claims, 3 Drawing Sheets

BATTERY MODULE AND POWER ARRANGEMENT METHOD

This application claims the benefit of People's Republic of China application Serial No. 202110002420.3, filed Jan. 4, 2021, the subject matter of which is incorporated herein by reference.

BACKGROUND OF THE INVENTION

Field of the Invention

The invention relates in general to a battery module, a power supply and a power arrangement method.

Description of the Related Art

The battery of the electric car currently available in the market normally includes a number of modularized battery modules. When the electric power of the battery is insufficient, the user needs to connect the battery to a high voltage grid of a charging station to charge the battery. However, when power cut occurs or when the charging station fails and cannot charge the battery but the residual power of the battery module of the battery has not yet dropped to the minimum discharging voltage, it is very likely that the electric car cannot be started or the power consuming functions of the electric car cannot be activated. Therefore, it has become a prominent task for the industries to provide an effective resolution, which cannot be found in the prior art, to resolve the above problem.

SUMMARY OF THE INVENTION

According to one embodiment of the present invention, a battery module is disclosed. The battery module includes a battery unit, an energy storage element, a switch, a functional circuit and a control unit. The energy storage element is coupled to the battery unit. The switch is coupled to the energy storage element. The functional circuit is respectively coupled to the battery unit and the energy storage element. The control unit is respectively coupled to the functional circuit and the switch, configured to control the functional circuit to cause the energy storage element to be coupled to the battery unit so that the battery unit charges the energy storage unit, or configured to control the functional circuit to cause the energy storage element to be decoupled with the battery unit so that a discharge path is formed.

According to another embodiment of the present invention, a power arrangement method is disclosed. The power arrangement method includes: based on controlling of a functional circuit of the battery module by a control unit of the battery module, coupling an energy storage element of the battery module to a battery unit of the battery module to cause the battery unit charges the energy storage element; and based on controlling the functional circuit by the control unit, decoupling the energy storage element with the battery unit, and controlling a switch of the battery module to be conducted to form a discharge path.

The above and other aspects of the invention will become better understood with regard to the following detailed description of the preferred but non-limiting embodiment(s). The following description is made with reference to the accompanying drawings.

DETAILED DESCRIPTION OF THE INVENTION

Figure 1:
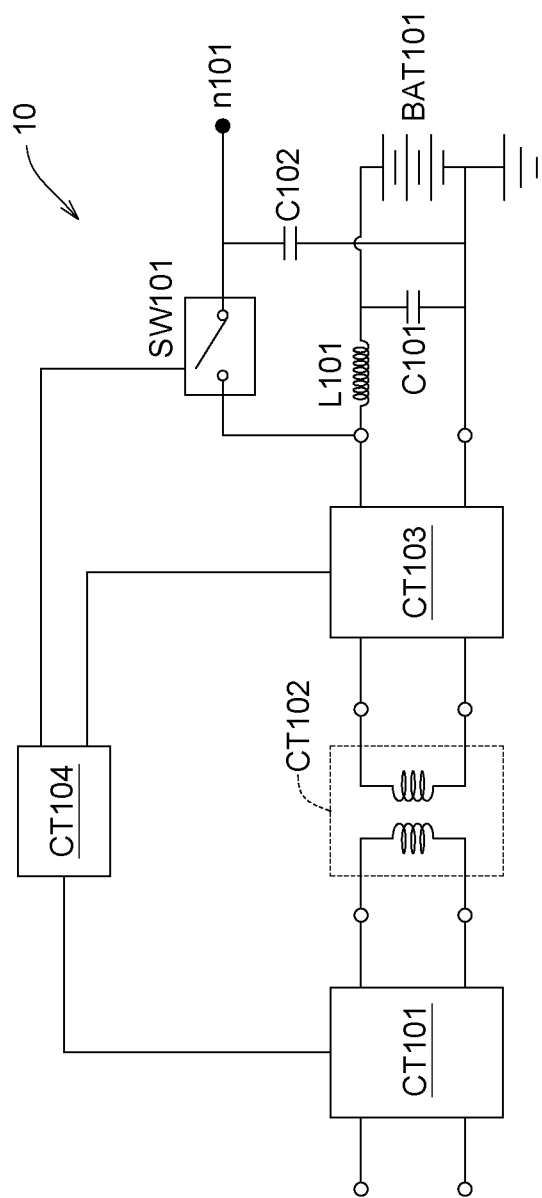
FIG. 1 is a block diagram of a battery module according to an embodiment of the present invention.

Referring to FIG. 1, a block diagram of a battery module according to an embodiment of the present invention is shown. The battery module 10 includes a functional circuit CT103, an energy storage element (inductor, in this embodiment) L101, two capacitors C101 and C102, a switch SW101, a control unit CT104 and a battery unit BAT101. In this embodiment, the battery module 10 further includes a regulator circuit CT101 and a transformer circuit CT102.

The regulator circuit CT101 has a first input end, a second input end, a first output end and a second output end. The first input end and the second input end are coupled to a voltage source (not illustrated). The regulator circuit CT101 can be realized by a combination of transistor, resistor, inductor and capacitor to regulate a voltage provided by the voltage source and then output the voltage via the first output end and the second output end.

The transformer circuit CT102 has a first input end, a second input end, a first output end and a second output end. The first input end and the second input end are respectively coupled to the first output end and the second output end of the regulator circuit CT101. The transformer circuit CT102 is used to convert the first voltage received by the first input end and the second input end into a second voltage of suitable magnitude and then output the second voltage via the first output end and the second output end.

The functional circuit CT103 has a first end, a second end, a third end and a fourth end. The first end and the second end are respectively coupled to the first output end and the second output end of the transformer circuit CT102. Functions and operations of the functional circuit CT103 are disclosed below.

A first end of the inductor L101 is coupled to the third end of the functional circuit CT103. A first end of the capacitor C101 is coupled to a second end of the inductor L101. A second end of the capacitor C101 is coupled to the fourth end of the functional circuit CT103. A first end of the switch SW101 is coupled to the first end of the inductor L101. A first end of the capacitor C102 is coupled to a second end of the switch SW101. A second end of the capacitor C102 is coupled to the second end of the capacitor C101. A first end of the battery unit BAT101 is coupled to the second end of the inductor L101. A second end of the battery unit BAT101 is coupled to the second end of the capacitor C102 and is reference grounded. The battery unit BAT101 may include one or more batteries, which can be connected in series, in parallel, or in series and parallel. The battery unit BAT101 can perform charging and discharging. The control unit CT104 is coupled to the regulator circuit CT101, the functional circuit CT103 and the switch SW101 (for example, all or some elements of the regulator circuit CT101 and the functional circuit CT103 as well as the control end of the switch SW101) and is used to configure/control the regulator circuit CT101, the functional circuit CT103 and the switch SW101.

In an embodiment, a power supply may include a number of battery modules 10, a common bus and a main controller. The battery modules are connected to a common bus via a node n101. The main controller is coupled to the control unit of the battery modules. The battery module 10 may have a charging mode and a power exchanging mode. Under the charging mode, the first input end and the second input end of the regulator circuit CT101 are coupled to the voltage source, the switch SW101 is controlled by the control unit CT104 to be not conducted, and the functional circuit CT103 is configured by the control unit CT104 to make the transformer circuit CT102 coupled to the inductor L101. That is, under the charging mode, the voltage source can charge the battery unit BAT101 via the regulator circuit CT101, the transformer circuit CT102, the functional circuit CT103, the inductor L101 and the capacitor C101. Under the power exchanging mode, the main controller of the power supply determines to configure at least one of the battery modules as a provider and configure another one of the battery modules as a receiver and instructs the corresponding control unit to implement the above configuration. The operation of the power exchanging mode is transmitting the electric power to the receiver from the provider. That is, under the power exchanging mode, the battery module configured as the provider transmits the electric power of the battery unit to the battery unit of the battery module configured as the receiver. That is, the provider and the receiver would have same circuit architecture and different circuit configurations. Details of the power exchanging mode are disclosed below.

Under the power exchanging mode, the functional circuit CT103 and the regulator circuit CT101 are configured by the control unit CT104 to make the transformer circuit CT102 incapacitated and unable to transmit electric power to the battery unit BAT101. The period for which the battery module is under the power exchanging mode includes a first time interval, at least one second time interval and at least one third time interval. During the first time interval, the switch SW101 of the provider is controlled by the control unit CT104 of the provider to be not conducted, the switch SW201 of the receiver is controlled by the control unit of the receiver to be intermittently conducted (such as at a first frequency) to avoid generating a surge current, the functional circuit CT103 of the provider is further configured by the control unit of the provider to make the first end of the inductor L101 of the provider not coupled to the second end of the battery unit BAT101 of the provider, and the functional circuit CT203 of the receiver is further configured by the control unit of the receiver to make the first end of the inductor L201 of the receiver not coupled to the second end of the battery unit BAT201 of the receiver. The first time interval finishes when a cross-voltage of two ends of the capacitor C102 of the provider and a cross-voltage of two ends of the capacitor C202 of the receiver are equivalent to a cross-voltage of two ends of the battery unit BAT201 of the receiver. The purpose of the first time interval is for the capacitor C102 of the provider to be charged such that the cross-voltage of the two ends of the capacitor C102 can be identical to the voltage of the battery unit BAT201 of the receiver. For the capacitor C102 of the provider to be charged, the inductor L101 of the provider must be incapacitated, such that the first end of the inductor L101 of the provider and the second end of the battery unit BAT101 of the provider (that is, the reference ground end) are decoupled and the first end of the inductor L201 of the receiver and the second end of the battery unit BAT101 of the receiver (that is, the reference ground end) are decoupled, and the inductor L101 of the provider is excluded from the circuit operations. During each second time interval, the switch SW101 of the provider is controlled by the control unit of the provider to be not conducted, the switch SW201 of the receiver is controlled by the control unit of the receiver to be conducted, the functional circuit CT103 of the provider is further configured by the control unit CT104 of the provider to make the first end of the inductor L101 of the provider coupled to the second end of the battery unit BAT101 of the provider, and the functional circuit CT203 of the receiver is further configured by the control unit of the receiver to make the first end of the inductor 2101 of the receiver not coupled to the second end of the battery unit BAT201 of the receiver. The purpose of the second time interval is for the electric power of the battery unit BAT101 of the provider to charge the inductor L101 of the provider. Thus, the first end of the inductor L101 of the provider needs to be coupled to the second end of the battery unit BAT101 of the provider (that is, the reference ground end) to form a complete current loop. Under the second time interval, the inductor L201 of the receiver can be incapacitated to be decoupled from the battery unit BAT201 of the receiver. During each third time interval, the switch SW101 of the provider is controlled by the control unit CT104 of the provider to be conducted, the switch SW201 of the receiver is controlled by the control unit of the receiver to be conducted, the functional circuit CT103 of the provider is further configured by the control unit of the provider to make the first end of the inductor L101 of the provider not coupled to the second end of the battery unit BAT101 of the provider, and the functional circuit CT203 of the receiver is further configured by the control unit of the receiver to make the first end of the inductor L201 of the receiver not coupled to the second end of the battery unit BAT201 of the receiver. The purpose of the third time interval is for the inductor L101 of the provider to charge the battery unit BAT201 of the receiver. Thus, the electric power of the battery unit BAT101 of the provider is transmitted to the inductor L101 of the provider, and then is further transmitted to the battery unit BAT201 of the receiver.

In short, when the power supply activates the power exchanging mode, firstly the operation of the first time interval is performed, then the operation of the second time interval and the operation of the third time interval are performed alternately until the electric power of the battery unit BAT101 of the receiver reaches a target value. The time axis of the period under the power exchanging mode is as follows: the first time interval, the second time interval, the third time interval, the second time interval, the third time interval, . . . , the second time interval, the third time interval, and the rest can be obtained by analogy. It should be noted that the length of each second time interval does not need to be the same. Similarly, the length of each third time interval does not need to be the same.

Figure 2:
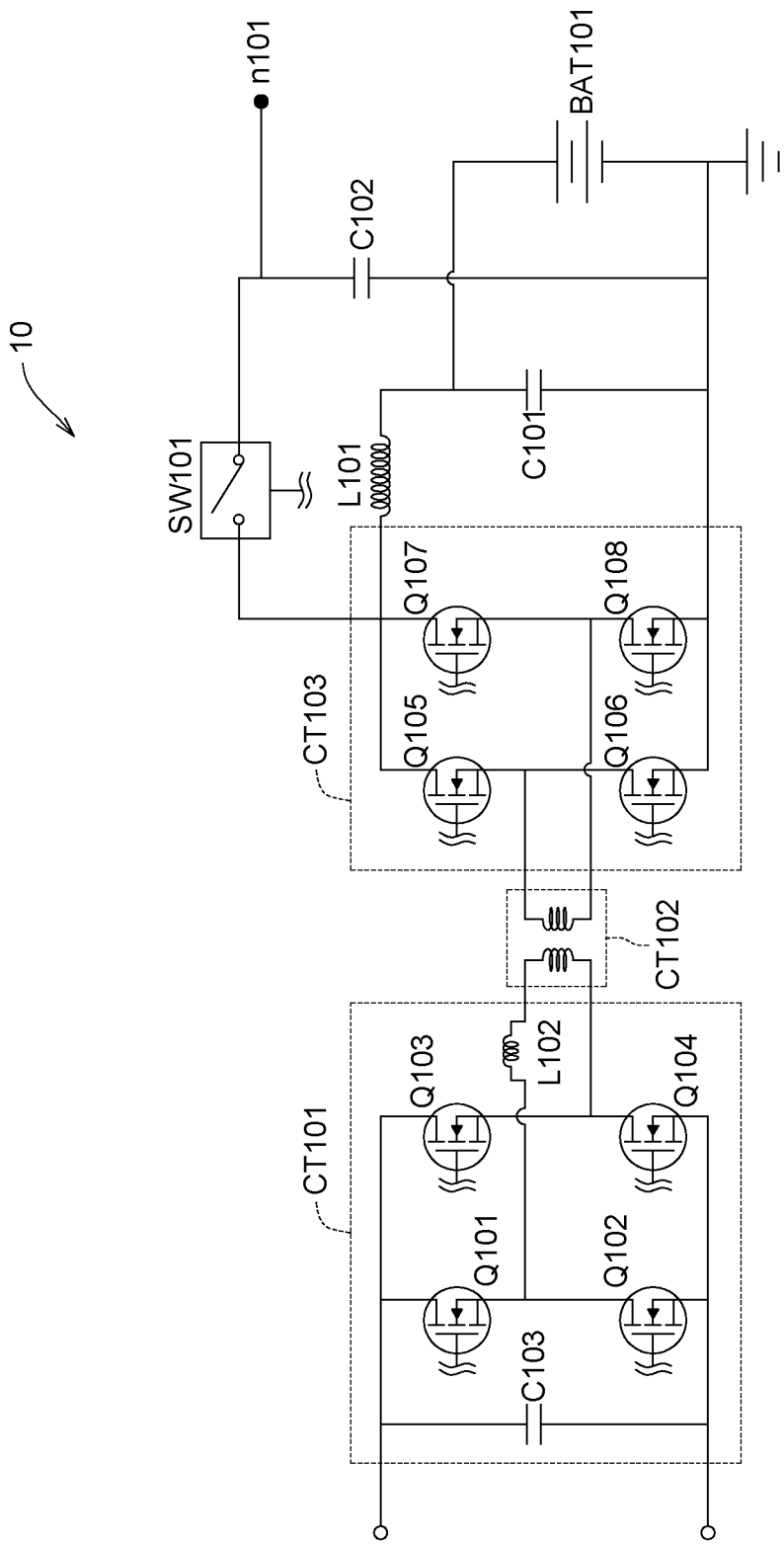
FIG. 2 is a block diagram of a battery module according to another embodiment of the present invention.

Referring to FIG. 2, a block diagram of a battery module according to another embodiment of the present invention is shown. FIG. 2 shows detailed circuit design of the regulator circuit and the functional circuit of FIG. 1. The regulator circuit CT101 includes transistors Q101~Q104, an inductor L102 and a capacitor C103. A first end of the capacitor C103 is used as the first input end of the regulator circuit CT101. A second end of the capacitor C103 is used as the second input end of the regulator circuit CT101. A first end of the transistor Q101 is coupled to the first end of the capacitor C103. A first end of the transistor Q102 is coupled to a second end of the transistor Q101. A second end of the transistor Q102 is coupled to the second end of the capacitor C103. A first end of the transistor Q103 is coupled to the first end of the capacitor C103. A first end of the transistor Q104 is coupled to a second end of the transistor Q103 and is used as the second output end of the regulator circuit CT101. A second end of the transistor Q104 is coupled to the second end of the capacitor C103. A first end of the inductor L102 is coupled to the second end of the transistor Q101. A second end of the inductor L102 is used as the first output end of the regulator circuit CT101.

The functional circuit CT103 includes a number of transistors Q105-Q108. A first end of the transistor Q105 is used as the third end of the functional circuit CT103. A first end of the transistor Q106 is coupled to a second end of the transistor Q105 and is used as the first end of the functional circuit CT103. A first end of the transistor Q107 is coupled to the first end of the transistor Q105. A first end of the transistor Q108 is coupled to a second end of the transistor Q107 and is used as the second end of the functional circuit CT103. A second end of the transistor Q108 is coupled to a second end of the transistor Q106 and is used as the fourth end of the functional circuit CT103.

It should be noted that for the accompanying drawings to be simplified, the details of coupling each of the transistors Q101~Q108 and a control end of the switch SW101 to a control unit CT104 (not illustrated in FIG. 2) are omitted in FIG. 2. That is, each of the transistors Q101~Q108 and the switch SW101 are controlled by the control unit CT104 to be conducted or not conducted.

For the present invention to be clearly understood, the operations of the battery module configured as the provider and the operations of the battery module configured as the receiver under the power exchanging mode are disclosed below with an accompanying drawing FIG. 3.

Figure 3:
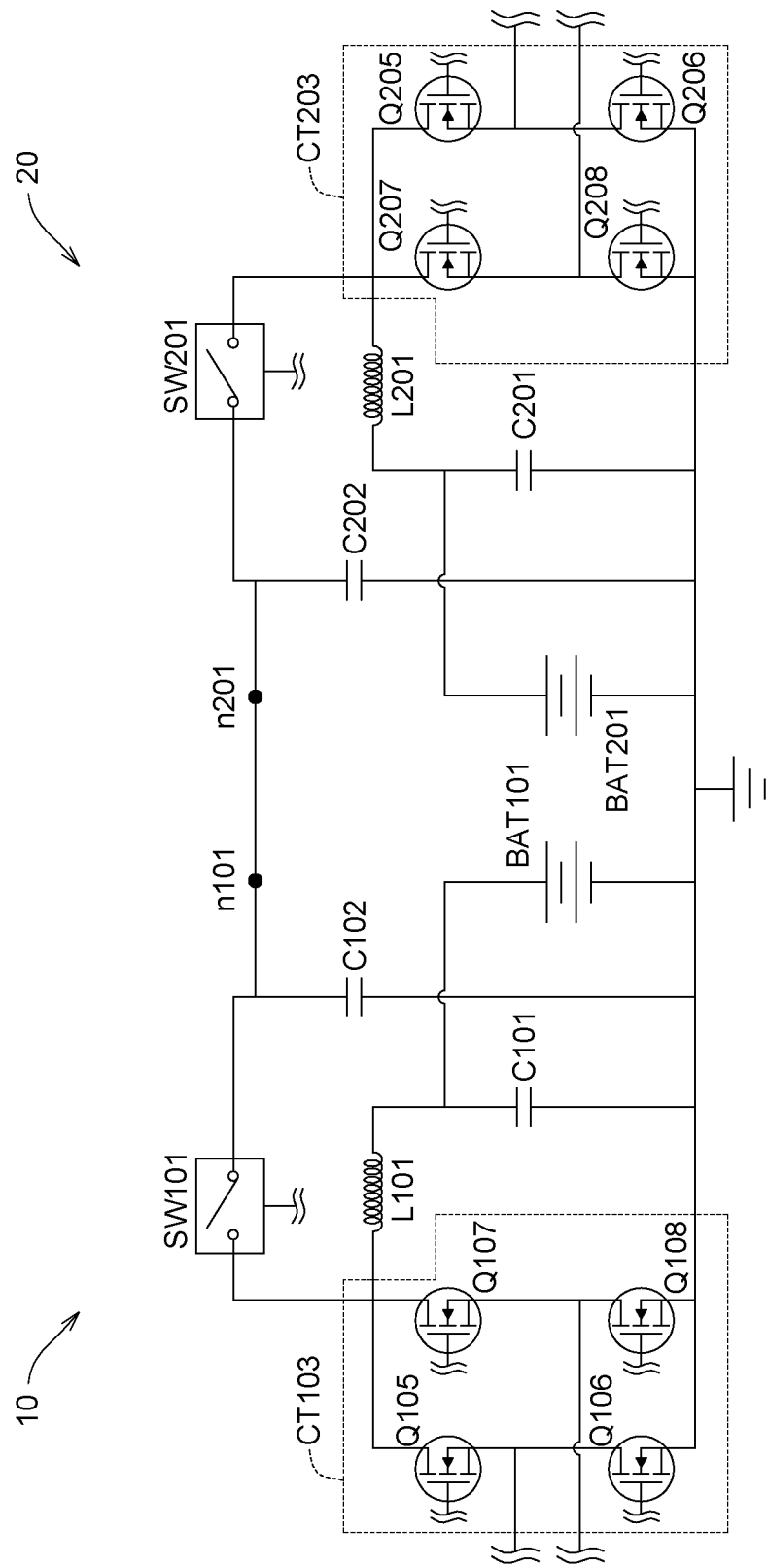
FIG. 3 is a schematic diagram of the exchange of electric power between the battery modules according to an embodiment of the present invention.

In the example of FIG. 3, the battery module 10 is configured as the provider, the battery module 20 is configured as the receiver, and a node n101 of the battery module 10 and a node n201 of the battery module 20 are connected to a common bus. It should be noted that for the accompanying drawings to be simplified, some elements are omitted. To be more precisely, the regulator circuit and the transformer circuit do not participate in the operations under the power exchanging mode and therefor are omitted. Besides, since the transistor and the switch of each of the battery modules are controlled by corresponding control units as disclosed above, the descriptions thereof are omitted.

During the period when the power exchanging mode is activated, since the regulator circuit CT101 and the transformer circuit CT102 do not participate in the operation, the transistors Q106, Q108, Q206, and Q208 remain to be conducted, such that the first output end and the second output end of the transformer circuit CT102 are coupled to the reference ground and become decoupled from the inductor L101. That is, the regulator circuit CT101 and the transformer circuit CT102 are excluded from the circuit operation of the power exchanging mode. That is, regardless of whether the time is the first time interval, the second time interval or the third time interval, the transistors Q106, Q108, Q206, and Q208 are all conducted. During the first time interval, the transistors Q105, Q107, Q205, and Q207 are not conducted, the switch SW101 is not conducted, and the switch SW201 is conducted at a first frequency. During the second time interval, the transistors Q105 and Q107 are conducted, the transistors Q205 and Q207 are not conducted, the switch SW101 is not conducted, and the switch SW201 is conducted. During the third time interval, the switches SW101 and SW201 are conducted but the transistors Q105, Q107, Q205, and Q207 are not conducted.

Through the above arrangement, the battery unit BAT101 of the battery module 10 can transmit electric power to the battery unit BAT201 of the battery module 20.

The battery module of the present invention can be used in the power supply of an electric car. The power supply may include a number of battery modules of the present invention. The battery modules can be connected to a common bus via the nodes (n101 and n201). When the power supply cannot be connected to an external voltage source (such as a power grid of a charging station) to perform charging, the power supply can use a main controller, which instructs the control unit of at least one of the battery modules to enter a power exchanging mode and configure the corresponding control unit as a provider and at the same time instructs the control unit of another one of the battery modules to enter the power exchanging mode and configure the corresponding control unit as a receiver. The battery unit of the provider can transmit electric power to the battery unit of the receiver.

While the invention has been described by way of example and in terms of the preferred embodiment(s), it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A battery module, comprising:
   a battery unit;
   an energy storage element, coupled to the battery unit;
   a switch, coupled to the energy storage element;
   a functional circuit, respectively coupled to the battery unit and the energy storage element; and
   a control unit, respectively coupled to the functional circuit and the switch, configured to control the functional circuit to cause the energy storage element to be coupled to the battery unit so that the battery unit charges the energy storage unit, or configured to control the functional circuit to cause the energy storage element to be decoupled with the battery unit so that a discharge path is formed;
   wherein the energy storage element is an inductor;
   wherein the battery module further comprises:
      a transformer circuit used to output a voltage to the functional circuit;
      a first capacitor, wherein a first end of the first capacitor is coupled to a second end of the inductor; and
      a second capacitor, wherein a first end of the second capacitor is coupled to a second end of the switch;
   wherein a first end of the inductor is coupled to one of a plurality of output ends of the functional circuit, a first end of the switch is coupled to the first end of the inductor, a first end of the battery unit is coupled to the second end of the switch, a second end of the battery unit is coupled to another one of the output ends of the functional circuit, and a second end of the first capacitor and a second end of the second capacitor are reference grounded, and the control unit is coupled to one or more control ends of the functional circuit and a control end of the switch.

2. The battery module according to claim 1, wherein when the battery module is under a power exchanging mode, the battery module is configured as a provider or a receiver, the functional circuit is configured to make the transformer circuit not coupled to the inductor; and
   wherein the switch is selectively conducted according to whether the battery module is configured as the provider or the receiver, and the functional circuit is configured to make the first end of the inductor selectively coupled to the second end of the battery unit.

3. The battery module according to claim 1, wherein when the battery module is configured as the provider, during a first time interval under the power exchanging mode, the switch is not conducted, and the functional circuit is configured to make the first end of the inductor not coupled to the second end of the battery unit; during a second time interval under the power exchanging mode, the switch is not conducted, and the functional circuit is configured to make the first end of the inductor coupled to the second end of the battery unit; during a third time interval under the power exchanging mode, the switch is conducted, and the functional circuit is configured to make the first end of the inductor not coupled to the second end of the battery unit.

4. The battery module according to claim 3, wherein when the battery module is configured as the receiver, during the first time interval, the switch is intermittently conducted, and the functional circuit is configured to make the first end of the inductor not coupled to the second end of the battery unit; during the second time interval, the switch is conducted, and the functional circuit is configured to make the first end of the inductor not coupled to the second end of the battery unit; during the third time interval, the switch is conducted, and the functional circuit is configured to make the first end of the inductor not coupled to the second end of the battery unit.

5. The battery module according to claim 4, wherein the second end of the switch is coupled to a common bus.

6. The battery module according to claim 3, wherein when the battery module is configured as the provider, the first time interval finishes when a cross-voltage of the second capacitor is identical to a cross-voltage of a first battery unit of a first battery module configured as the receiver.

7. The battery module according to claim 4, wherein when the battery module is configured as the receiver, the first time interval finishes when a cross-voltage of the second capacitor is identical to a cross-voltage of the battery unit.

8. The battery module according to claim 4, wherein the functional circuit comprises a plurality of electric switches connected in bridge connection.

9. The battery module according to claim 4, wherein the functional circuit comprises:
  a first transistor, wherein a first end of the first transistor is coupled to the first end of the inductor, a second end of the first transistor is coupled to the transformer circuit, and a control end of the first transistor is coupled to the control unit;
  a second transistor, wherein a first end of the second transistor is coupled to the second end of the first transistor, a second end of the second transistor is coupled to the second end of the battery unit, and a control end of the second transistor end is coupled to the control unit;
  a third transistor, wherein a first end of the third transistor is coupled to the first end of the first transistor, a second end of the third transistor is coupled to the transformer circuit, and a control end of the third transistor is coupled to the control unit; and
  a fourth transistor, wherein a first end of the fourth transistor is coupled to the second end of the third transistor, a second end of the fourth transistor is coupled to the second end of the second transistor, and a control end of the fourth transistor is coupled to the control unit.

10. The battery module according to claim 9, wherein under the power exchanging mode, the second transistor and the fourth transistor are conducted; when the battery module is configured as the provider, the first transistor and the third transistor are conducted during the second time interval but are not conducted during the first time interval and the third time interval.

11. The battery module according to claim 9, wherein under the power exchanging mode, the second transistor and the fourth transistor are conducted; when the battery module is configured as the receiver, the first transistor and the third transistor are not conducted during the first time interval, the second time interval and the third time interval.

12. A power arrangement method of battery module, comprising
  based on controlling of a functional circuit of the battery module by a control unit of the battery module, coupling an energy storage element of the battery module to a battery unit of the battery module to cause the battery unit charges the energy storage element; and
  based on controlling the functional circuit by the control unit, decoupling the energy storage element with the battery unit, and controlling a switch of the battery module to be conducted to form a discharge path;
  wherein the energy storage element is an inductor;
  wherein the battery module further comprises:
    a transformer circuit used to output a voltage to the functional circuit;
    a first capacitor, wherein a first end of the first capacitor is coupled to a second end of the inductor; and
    a second capacitor, wherein a first end of the second capacitor is coupled to a second end of the switch;
  wherein a first end of the inductor is coupled to one of a plurality of output ends of the functional circuit, a first end of the switch is coupled to the first end of the inductor, a first end of the battery unit is coupled to the second end of the switch, a second end of the battery unit is coupled to another one of the output ends of the functional circuit, and a second end of the first capacitor and a second end of the second capacitor are reference grounded, and the control unit is coupled to one or more control ends of the functional circuit and a control end of the switch.

13. The power arrangement method according to claim 12, further comprising: configuring the battery module as a provider; and in a first time interval, based on controlling the functional circuit by the control unit and not conducting the switch, decoupling the energy storage element with the battery unit to charge a capacitor coupled to a first switch of a first battery module to cause a cross-voltage of the capacitor to be identical to a cross-voltage of a first battery unit of the first battery module, where the first battery module is configured as a receiver and is connected to the battery module by a common bus.

14. The power arrangement method according to claim 12, further comprising: configuring the battery module as a receiver; in a first time interval, and in a first time interval, based on controlling the functional circuit by the control unit and intermittently conducting the switch, coupling the energy storage element with a first battery module to cause a cross-voltage of a capacitor coupled to the switch is identical to a cross-voltage of the battery unit, wherein the first battery module is configured as a provider and is connected to the battery module by a common bus.

15. The power arrangement method according to claim 13, wherein based on controlling of a functional circuit of the battery module by a control unit of the battery module, coupling an energy storage element of the battery module to a battery unit of the battery module to cause the battery unit charges the energy storage element is performed in a second time interval, and the switch is not conducted in the second interval.

16. The power arrangement method according to claim 12, wherein based on controlling the functional circuit by the control unit, decoupling the energy storage element with the battery unit, and controlling a switch of the battery module to be conducted to form a discharge path is performed in a third time interval, and the switch is conducted.

17. The power arrangement method according to claim 13, wherein based on controlling of a functional circuit of the battery module by a control unit of the battery module, coupling an energy storage element of the battery module to a battery unit of the battery module to cause the battery unit charges the energy storage element is performed in a second time interval, and the switch is conducted in the second interval.

18. The power arrangement method according to claim 13, wherein based on controlling the functional circuit by the control unit, decoupling the energy storage element with the battery unit, and controlling a switch of the battery module to be conducted to form a discharge path is performed in a third time interval, and the switch is conducted.

* * * * *